United States Patent
Tsai et al.

(10) Patent No.: US 12,461,807 B2
(45) Date of Patent: Nov. 4, 2025

(54) METHOD FOR RESPONDING TO COMMAND, STORAGE DEVICE AND STORAGE SYSTEM

(71) Applicant: Realtek Semiconductor Corporation, Hsinchu (TW)

(72) Inventors: Yi Cheng Tsai, Hsinchu (TW); Sung-Kao Liu, Hsinchu (TW); Cheng-Yuan Hsiao, Hsinchu (TW); Po-Hao Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 66 days.

(21) Appl. No.: 18/449,691

(22) Filed: Aug. 14, 2023

(65) Prior Publication Data

US 2024/0126633 A1 Apr. 18, 2024

(30) Foreign Application Priority Data

Oct. 18, 2022 (TW) .................................. 111139502

(51) Int. Cl.
*G06F 11/07* (2006.01)
*G06F 13/40* (2006.01)

(52) U.S. Cl.
CPC ...... *G06F 11/0772* (2013.01); *G06F 11/0784* (2013.01); *G06F 13/4027* (2013.01)

(58) Field of Classification Search
CPC ............. G06F 11/0772; G06F 11/0784; G06F 13/4027; G06F 11/0703; G06F 11/079; G06F 11/0793

USPC .......................................................... 714/48
See application file for complete search history.

(56) References Cited

U.S. PATENT DOCUMENTS

2012/0057389 A1* 3/2012 Ryu ...................... G11C 16/20
365/49.1
2020/0303012 A1* 9/2020 Nishikawa ........... G11C 16/349

FOREIGN PATENT DOCUMENTS

TW 201437802 A 10/2014

OTHER PUBLICATIONS

Wikipedia "error" page, retrieved from https://en.wikipedia.org/wiki/Error (Year: 2025).*
"DpANS USB Attached SCSI (UAS)" American National Standards Institute, Inc., Mar. 9, 2010.
"Working Draft SCSI Architecture Model—6 (SAM-6)" American National Standards Institute, Inc., Jan. 5, 2018.

* cited by examiner

*Primary Examiner* — Yair Leibovich
(74) *Attorney, Agent, or Firm* — CKC & Partners Co., LLC

(57) ABSTRACT

A method for responding to a command is adapted for a storage device. The method for responding to a command includes following steps of: sequentially receiving a first command and a second command by a bridge of the storage device from a host; executing the first command and the second command to generate a status completion signal or a status error signal by the bridge; and detecting an error state of at least one of the first command and the second command to execute a response mode or an idle mode by the bridge according to the error state so as to respond to the host.

18 Claims, 11 Drawing Sheets

METHOD FOR RESPONDING TO COMMAND, STORAGE DEVICE AND STORAGE SYSTEM

CROSS-REFERENCE TO RELATED APPLICATION

This application claims priority to Taiwan Application Serial Number 111139502, filed on Oct. 18, 2022, which is herein incorporated by reference in its entirety.

BACKGROUND

Field of Invention

The present disclosure relates to a method, an electronic device, and an electronic system. More particularly, the present disclosure relates to a method for responding to a command, a storage device, and a storage system.

Description of Related Art

Conventional response to Small Computer System Interface (SCSI) commands is relatively simple. In the same platform, only the same response mode can be provided for an error status of a command. However, an error status of the same command may be handled differently on different platforms.

For the foregoing reason, there is a need to provide a suitable method for responding to a command to solve the problems of the prior art.

SUMMARY

One aspect of the present disclosure provides a method for responding to a command. The method for responding to a command is adapted for a storage device. The method for responding to a command includes following steps of: sequentially receiving a first command and a second command by a bridge of the storage device from a host; executing the first command and the second command by the bridge to generate a status completion signal or a status error signal; and detecting an error state of at least one of the first command and the second command by the bridge to execute a response mode or an idle mode according to the error state so as to respond to the host.

Another aspect of the present disclosure provides a storage device. The storage device includes a memory and a bridge. The bridge is coupled to the memory, and is configured to sequentially receive a first command and a second command from a host. The bridge is configured to execute the first command and the second command in the memory to generate a status completion signal or a status error signal to the host. The bridge is configured to detect an error state of at least one of the first command and the second command to execute a response mode or an idle mode according to the error state so as to respond to the host.

Another aspect of the present disclosure provides a storage system. The storage system includes a host and a storage device. The host is configured to generate a first command and a second command. The storage device is coupled to the host. The storage device includes a memory and a bridge. The bridge is coupled the host and the memory, and is configured to sequentially receive a first command and a second command. The bridge is configured to execute the first command and the second command in the memory to generate a status completion signal or a status error signal to the host. The bridge is configured to detect an error state of at least one of the first command and the second command to execute a response mode or an idle mode according to the error state so as to respond to the host.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
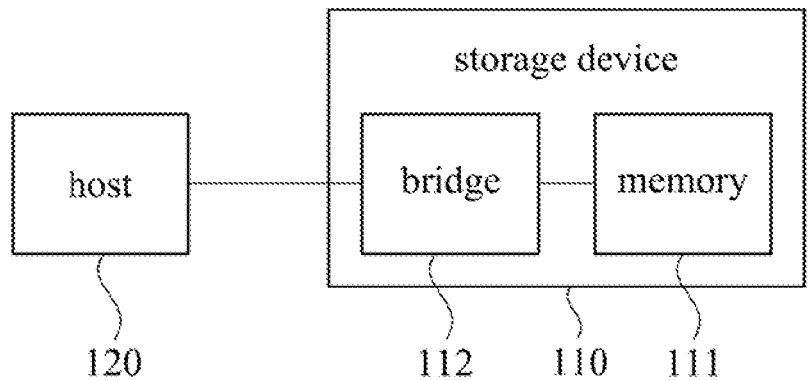
FIG. 1 depicts a schematic diagram of a storage system according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a storage system 100 according to some embodiments of the present disclosure. In some embodiments, the storage system 100 includes a storage device 110 and a host 120. The storage device 110 is coupled to the host 120. The storage device 110 includes a memory 111 and a bridge 112. The bridge 112 is coupled to the memory 111 and the host 120.

In some embodiments, the host 120 is configured to generate a first command and a second command. The bridge 112 is configured to sequentially receive a first command and a second command.

Then, the bridge 112 is configured to execute the first command and the second command in the memory 111 to generate a status completion signal or a status error signal to the host 120.

Furthermore, the bridge 112 is configured to detect an error state of at least one of the first command and the second command to execute a response mode or an idle mode according to the error state so as to respond to the host 120.

In some embodiments, the bridge 112 is further configured to generate and transmit the status error signal to the host 120 according to the error state so as to respond to the at least one of the first command and the second command in the response mode, and it is further expected that the host 120 generate a resend command to re-execute the at least one of the first command and the second command.

In some embodiments, the storage device 110 can be solid-state drives or solid-state disks (SSD).

In some embodiments, the memory 111 can be a flash memory or a volatile memory.

In some embodiments, the bridge 112 includes a chip supporting a Small Computer System Interface (SCSI) standard. The Small Computer System Interface is a processor-independent standard for system-level interfaces between computers and computer peripheral devices (e.g., hard drives, floppy drives, CD drives, printers, and scanners). It should be noted that the bridge 112 may contain necessary components such as hardware circuits and processor. The processor executes software instructions to cooperate with the hardware circuits, so as to implement specific functions and operations described in the present disclosure.

In some embodiments, the host 120 can be a computer device or a camera device. The host 120 can communicate with the bridge 112 through a universal serial bus (USB) attached SCSI protocol for data transmission.

Figure 2:
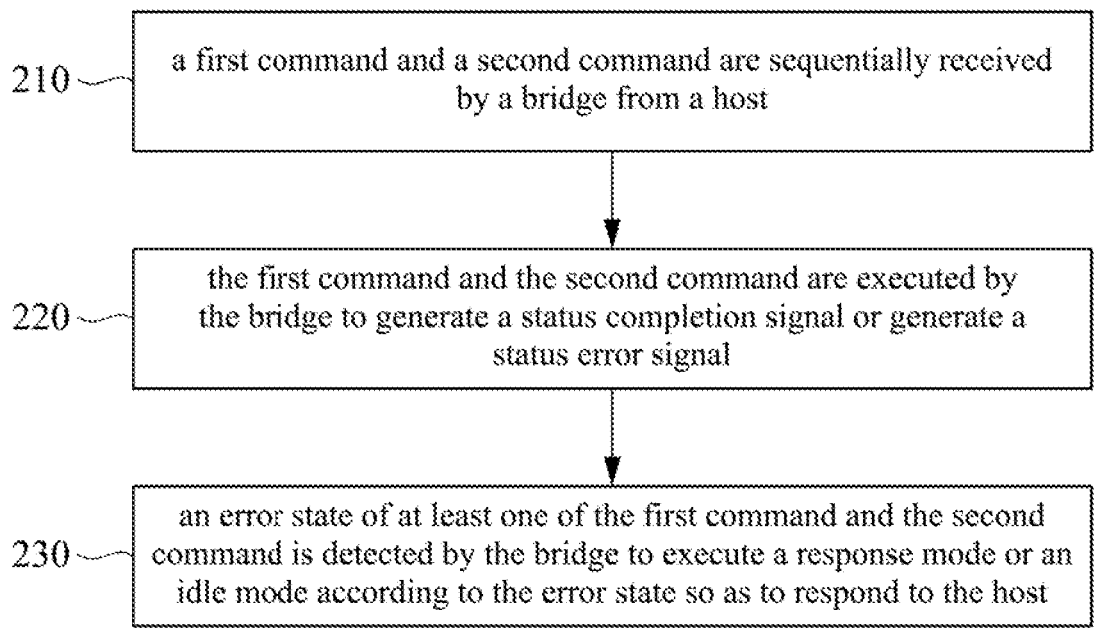
FIG. 2 depicts a flow chart of a method for responding to a command according to some embodiments of the present disclosure.
Figure 3:
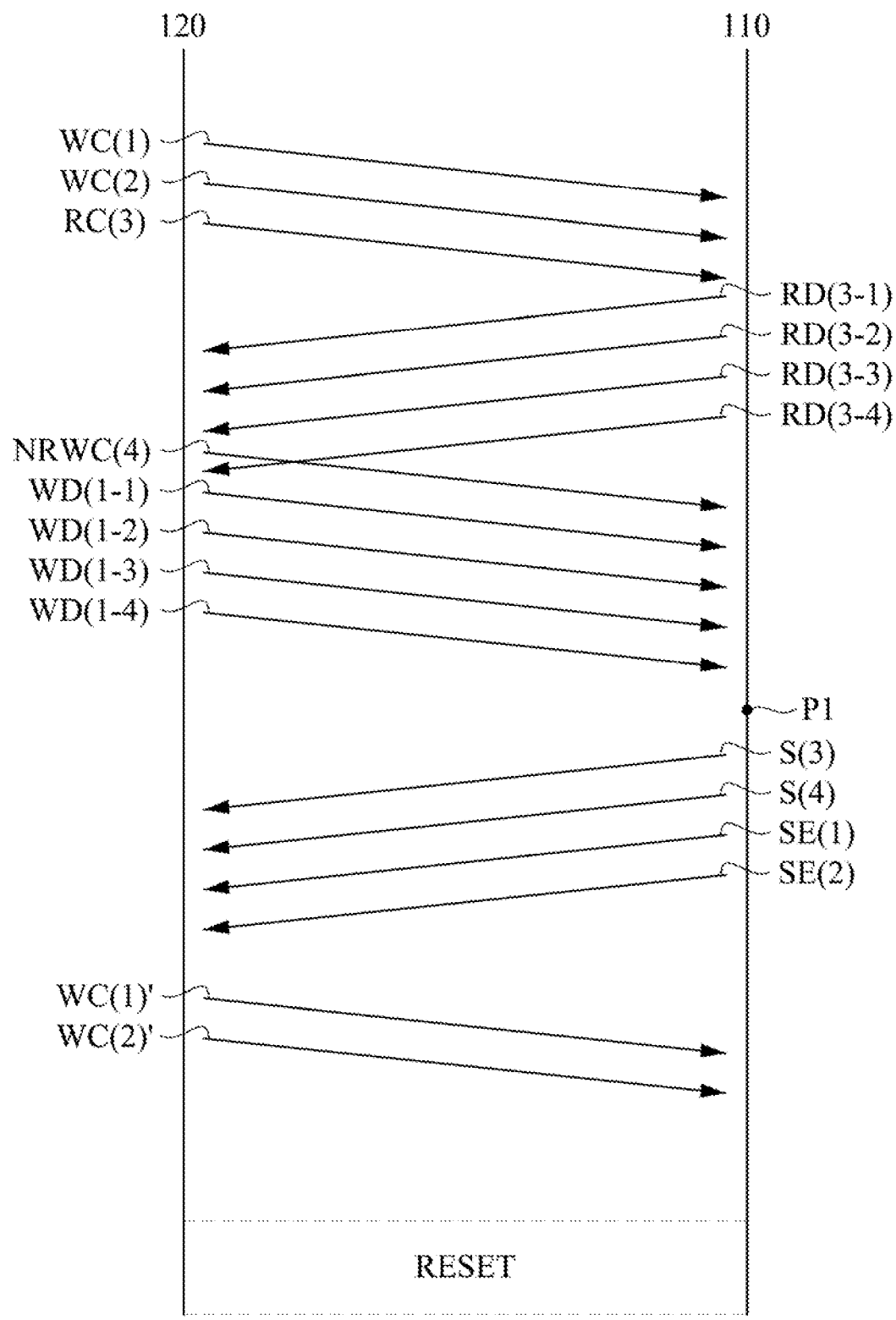
FIG. 3 depicts a schematic diagram of commands and signals transmission of a storage system according to some embodiments of the present disclosure.

In some embodiments, in order to facilitate the understanding of a method for responding to a command 200, please refer to FIG. 1 to FIG. 3 together. FIG. 2 depicts a flow chart of the method for responding to a command 200 according to some embodiments of the present disclosure. FIG. 3 depicts a schematic diagram of commands and signals transmission of a storage system according to some embodiments of the present disclosure. In some embodiments, the method for responding to a command 200 can be implemented by the storage system 100 of FIG. 1. Following paragraphs will take the embodiment of FIG. 3 as the main description. It should be noted that the embodiment of FIG. 3 is a schematic diagram of commands and signals transmission between the storage device 110 and the host 120 of the storage system 100 according to some embodiments of the present disclosure.

In step 210, a first command and a second command are sequentially received by a bridge from a host.

For example, please refer to FIG. 1 to FIG. 3, the bridge 112 of the storage device 110 is configured to sequentially receive a first command (e.g., a first write subcommand WC(1) and a second write subcommand WC(2)) and a second command (e.g., a read command RC(3)) from the host 120.

In step 220, the first command and the second command are executed by the bridge to generate a status completion signal or a status error signal.

For example, please refer to FIG. 1 to FIG. 3, the bridge 112 of the storage device 110 execute the first command (e.g., a first write subcommand WC(1) and a second write subcommand WC(2)) and the second command (e.g., a read command RC(3)) in the memory 111 to generate a status completion signal (e.g., a status completion signal S(3)) or a status error signal (e.g., a first status error signal SE(1) and a second status error signal SE(2)). In some embodiments, the aforementioned status error signal can be, for example, a check condition signal defined in the SCSI standard.

In some embodiments, write commands and read commands account for most of commands between the storage device 110 and the host 120. In some embodiments, types of non-read-write command include more than 20 types of SCSI commands.

It should be noted that a first number in a brackets ( ) represents a sign of a corresponding signal. It is further explained that a piece of first read data RD(3-1), a piece of second read data RD(3-2), a piece of third read data RD(3-3) and a piece of fourth read data RD(3-4) are pieces of read data obtained by the bridge 112 of the storage device 110 executing the read command RC(3) in the memory 111. Since the read command RC(3) reads a large pieces of data at one time, it is necessary to read the pieces of data from the storage device 110 in batches.

Similarly, a piece of first written data WD(1-1), a piece of second written data WD(1-2), a piece of third written data WD(1-3), and a piece of fourth written data WD(1-4) are pieces of written data programmed by the bridge 112 of the storage device 110 executing the first write subcommand WC(1) in the memory 111. Since the first write subcommand WC(1) writes a large pieces of data at one time, it is necessary to write the pieces of data into the storage device 110 in batches.

Then, the status completion signal S(3) is a status completion signal corresponding to an end of programming of the read command RC(3), which represents a completion of the read command RC(3).

Furthermore, the first status error signal SE(1) is a status error signal corresponding to the first write subcommand WC(1), which represents an error state during an execution of the first write subcommand WC(1). Similarly, the second status error signal SE(2) is a status error signal corresponding to the second write subcommand WC(2), which represents an error state during an execution of the second write subcommand WC(2).

In step 230, an error state of at least one of the first command and the second command is detected by the bridge to execute a response mode or an idle mode according to the error state so as to respond to the host.

For example, please refer to FIG. 1 to FIG. 3, the bridge 112 of the storage device 110 is configured to detect an error state of at least one of the first command (e.g., the first write subcommand WC(1) and the second write subcommand WC(2)) and the second command (e.g., the read command RC(3)) by the bridge to execute a response mode or an idle mode according to the error state so as to respond to the host 120.

In some embodiments, please refer to FIG. 3, the bridge 112 of the storage device 110 is configured to generate the status completion signal S(3) to respond to the read command RC(3) in a specific type of command response mode of the response mode.

Then, the bridge 112 of the storage device 110 is configured to detect the error state of the at least one of the first write subcommand WC(1) and the second write subcommand WC(2) at a time point P1 in the specific type of command response mode of the response mode.

Furthermore, the bridge 112 of the storage device 110 is configured to generate the first status error signal SE(1) and the second status error signal SE(2) according to the error state of the at least one of the first write subcommand WC(1) and the second write subcommand WC(2).

In addition, the host 120 is configured to generate a resend command (e.g., a resend command WC(1)' and a resend command WC(2)') according to the first status error signal SE(1) and the second status error signal SE(2) to re-execute the first write subcommand WC(1) and the second write subcommand WC(2).

In some embodiments, if a number of resend commands generated by the host 120 exceeds a predetermined number built in the host, the host 120 is configured to reset the storage device 110 in a reset stage RESET. In some embodiments, the host 120 is configured to decide whether to generate a reset command. In other word, the host 120 can be rest directly in the reset stage RESET.

Figure 4:
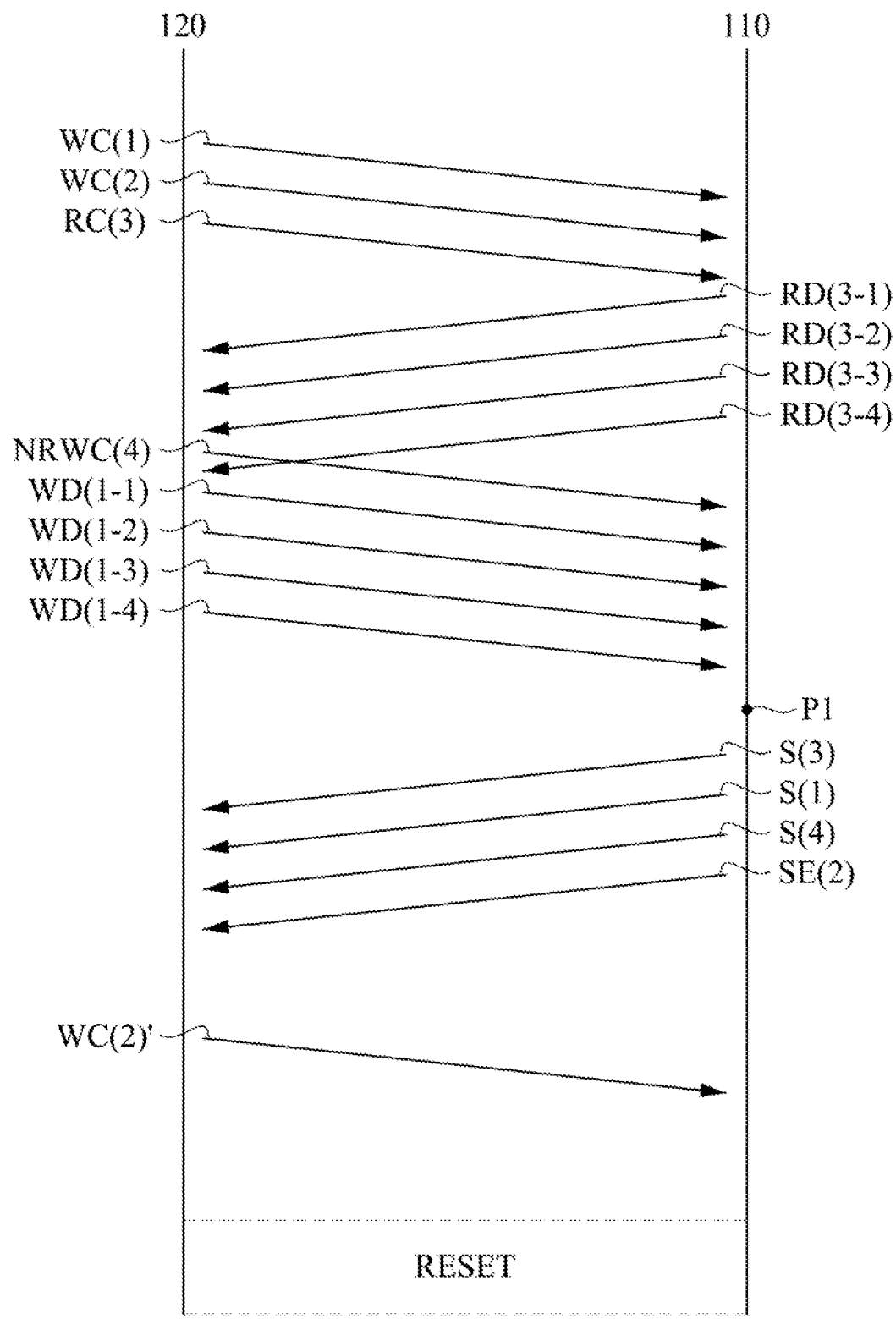
FIG. 4 depicts a schematic diagram of commands and signals transmission of a storage system according to some embodiments of the present disclosure.

FIG. 4 depicts a schematic diagram of commands and signals transmission of a storage system according to some embodiments of the present disclosure. In some embodiments, please refer to FIG. 3 and FIG. 4, a command transmission situation above a time point P1 of the embodiment in FIG. 4 is the same as a command transmission situation above the time point P1 of the embodiment in FIG. 3. A difference between the embodiment in FIG. 4 and the embodiment in FIG. 3 is that an error state of a command after the time point P1 is different.

In some embodiments, please refer to FIG. 4, the bridge 112 of the storage device 110 is configured to generate the status completion signal S(1) and the status completion signal S(3) to respond to the first write subcommand WC(1) and the read command RC(3) in an error command response mode of the response mode.

Then, the bridge 112 of the storage device 110 is configured to detect the error state of the second write subcommand WC(2) at the time point P1 in the error command response mode of the response mode.

Furthermore, the bridge 112 of the storage device 110 is configured to generate the second status error signal SE(2) according to the error state of the second write subcommand WC(2).

In addition, the host 120 is configured to generate a resend command (e.g., a resend command WC(2)') according to the second status error signal SE(2) to re-execute the second write subcommand WC(2).

Figure 5:
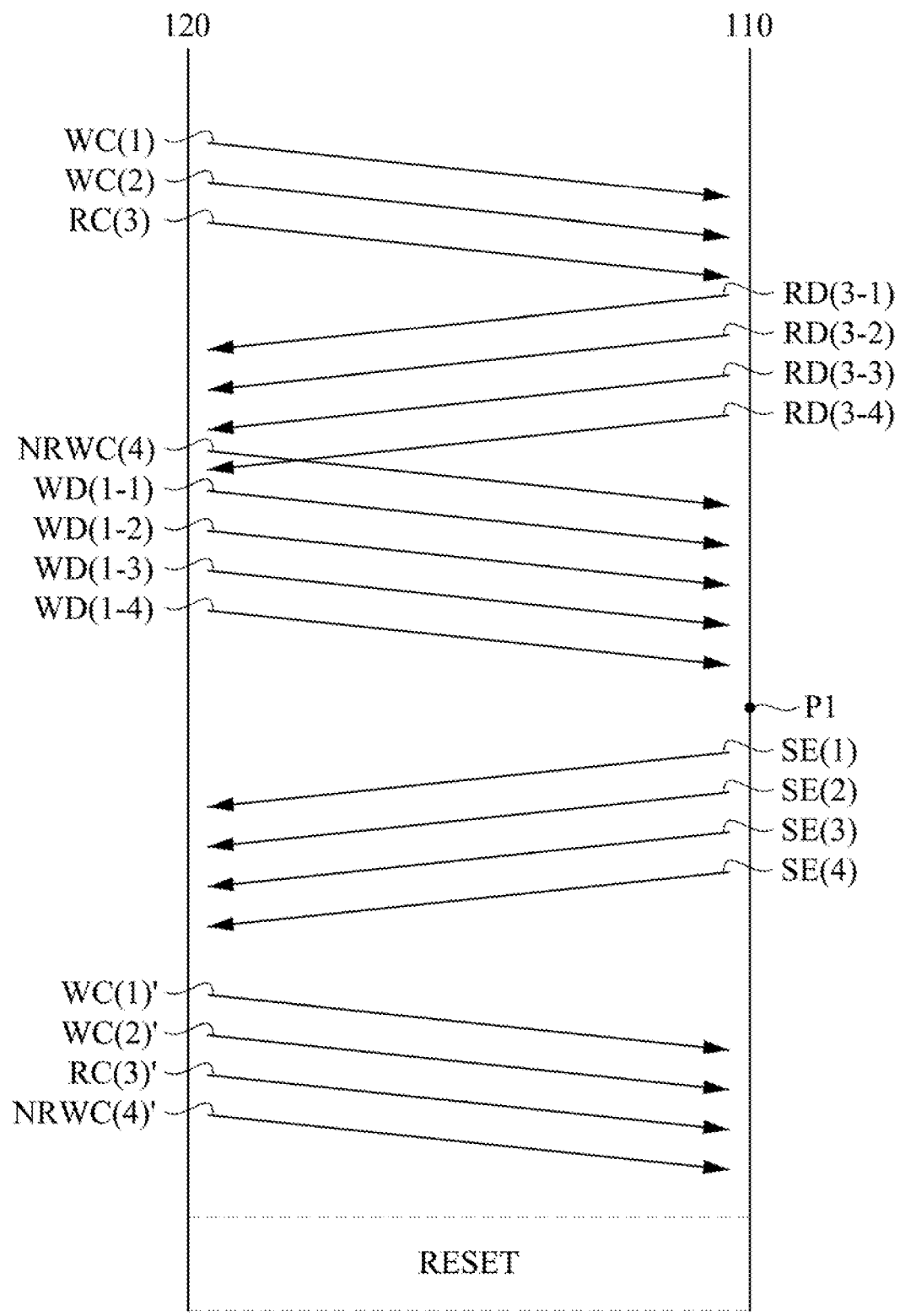
FIG. 5 depicts a schematic diagram of commands and signals transmission of a storage system according to some embodiments of the present disclosure.

FIG. 5 depicts a schematic diagram of commands and signals transmission of a storage system according to some embodiments of the present disclosure. In some embodiments, please refer to FIG. 3 and FIG. 5, a command transmission situation above a time point P1 of the embodiment in FIG. 5 is the same as a command transmission situation above the time point P1 of the embodiment in FIG. 3. A difference between the embodiment in FIG. 5 and the embodiment in FIG. 3 is that an error state of a command is different.

In some embodiments, please refer to FIG. 5, the bridge 112 of the storage device 110 is configured to detect the error state of the at least one of the first write subcommand WC(1), the second write subcommand WC(2), and the read command RC(3) at the time point P1 in an all of commands response mode of the response mode. The bridge 112 is configured to generate the corresponding first status error signal SE(1), the second status error signal SE(2), and a third status error signal SE(3) in response to all the first write subcommand WC(1), the second write subcommand WC(2), and the read command RC(3).

In addition, the host 120 is configured to generate a resend command (e.g., a resend command WC(1)', a resend command WC(2)', and a resend command RC(3)') according to the first status error signal SE(1), the second status error signal SE(2), and the third status error signal SE(3) to re-execute all the first write subcommand WC(1), the second write subcommand WC(2), and the read command RC(3).

Figure 6:
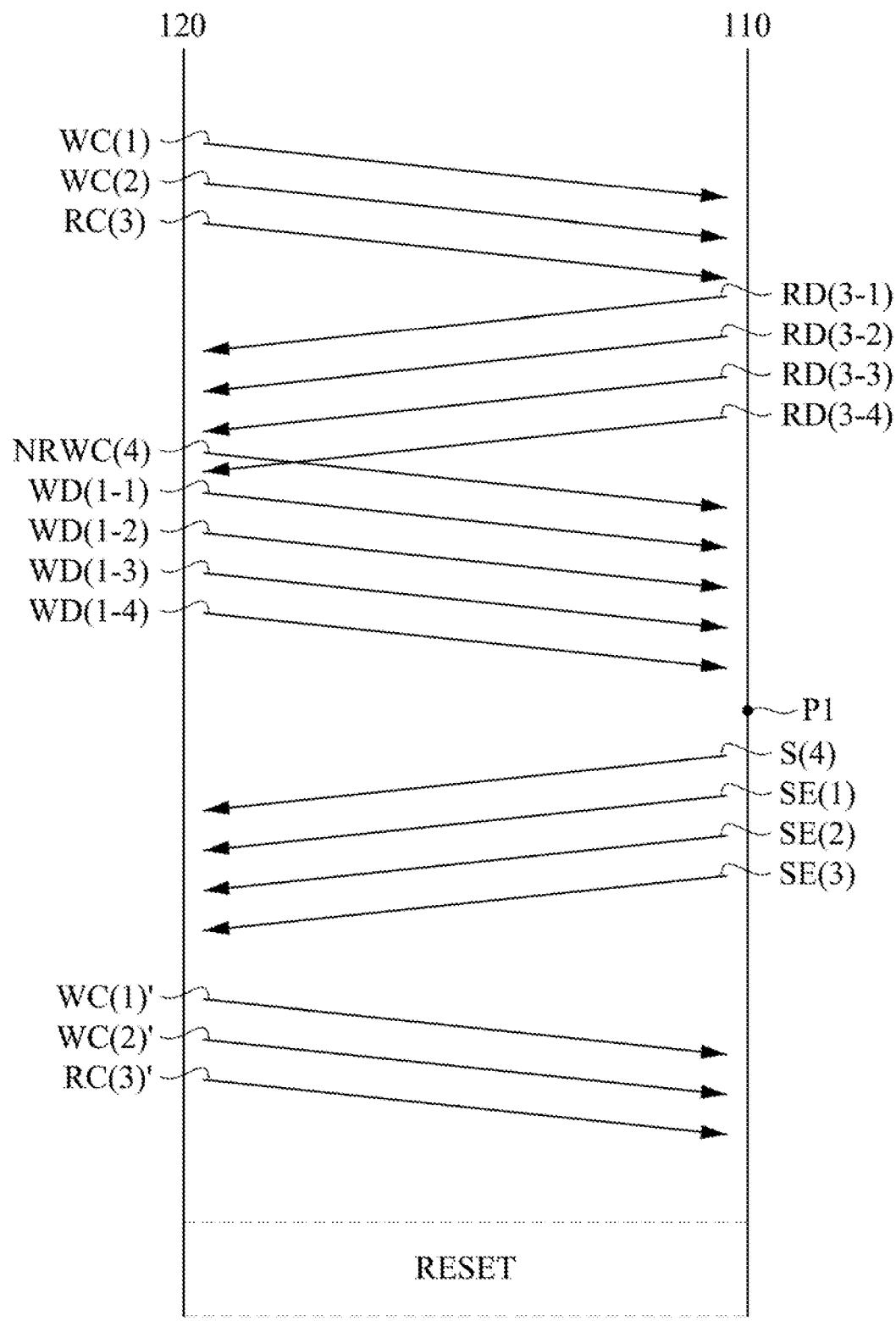
FIG. 6 depicts a schematic diagram of commands and signals transmission of a storage system according to some embodiments of the present disclosure.

FIG. 6 depicts a schematic diagram of commands and signals transmission of a storage system according to some embodiments of the present disclosure. In some embodiments, please refer to FIG. 3 and FIG. 6, a command transmission situation above a time point P1 of the embodiment in FIG. 6 is the same as a command transmission situation above the time point P1 of the embodiment in FIG. 3. A difference between the embodiment in FIG. 6 and the embodiment in FIG. 3 is that an error state of a command after the time point P1 is different.

In some embodiments, please refer to FIG. 3 to FIG. 6, the bridge 112 of the storage device 110 is configured to receive a third command (e.g., a non-read-write command NRWC(4)) from the host 120. It should be noted that, in practice, a transmission sequence of the first command (e.g., the first write subcommand WC(1) and the second write subcommand WC(2)), the second command (e.g., the read command RC(3)), and the third command (e.g., the non-read-write command NRWC(4)) is not limited to the figure.

In some embodiments, please refer to FIG. 3 to FIG. 6, a status completion signal S(4) is a status completion signal corresponding to a completion of programming of the non-read-write command NRWC(4), which represents a completion of an execution of the non-read-write command NRWC(4). Furthermore, a fourth status error signal SE(4) is a status error signal corresponding to the non-read-write command NRWC(4), which represents an error state during an execution of the non-read-write command NRWC(4).

In some embodiments, please refer to FIG. 6, the bridge 112 of the storage device 110 is configured to generate the status completion signal S(4) in response to the non-read-write command NRWC(4) in a multiple types of command response mode of the response mode.

Then, the bridge 112 of the storage device 110 is configured to detect the error state of the at least one of the first write subcommand WC(1), the second write subcommand WC(2), and the read command RC(3) at the time point P1 in the multiple types of command response mode of the response mode.

Furthermore, the bridge 112 is configured to generate the first status error signal SE(1), the second status error signal SE(2), and the third status error signal SE(3) according to the error state of the at least one of the first write subcommand WC(1), the second write subcommand WC(2), and the read command RC(3).

In addition, the host 120 is configured to generate a resend command (e.g., the resend command WC(1)', the resend command WC(2)', and the resend command RC(3)') according to the first status error signal SE(1), the second status error signal SE(2), and the third status error signal SE(3) to re-execute the first write subcommand WC(1), the second write subcommand WC(2), and the read command RC(3).

Figure 7:
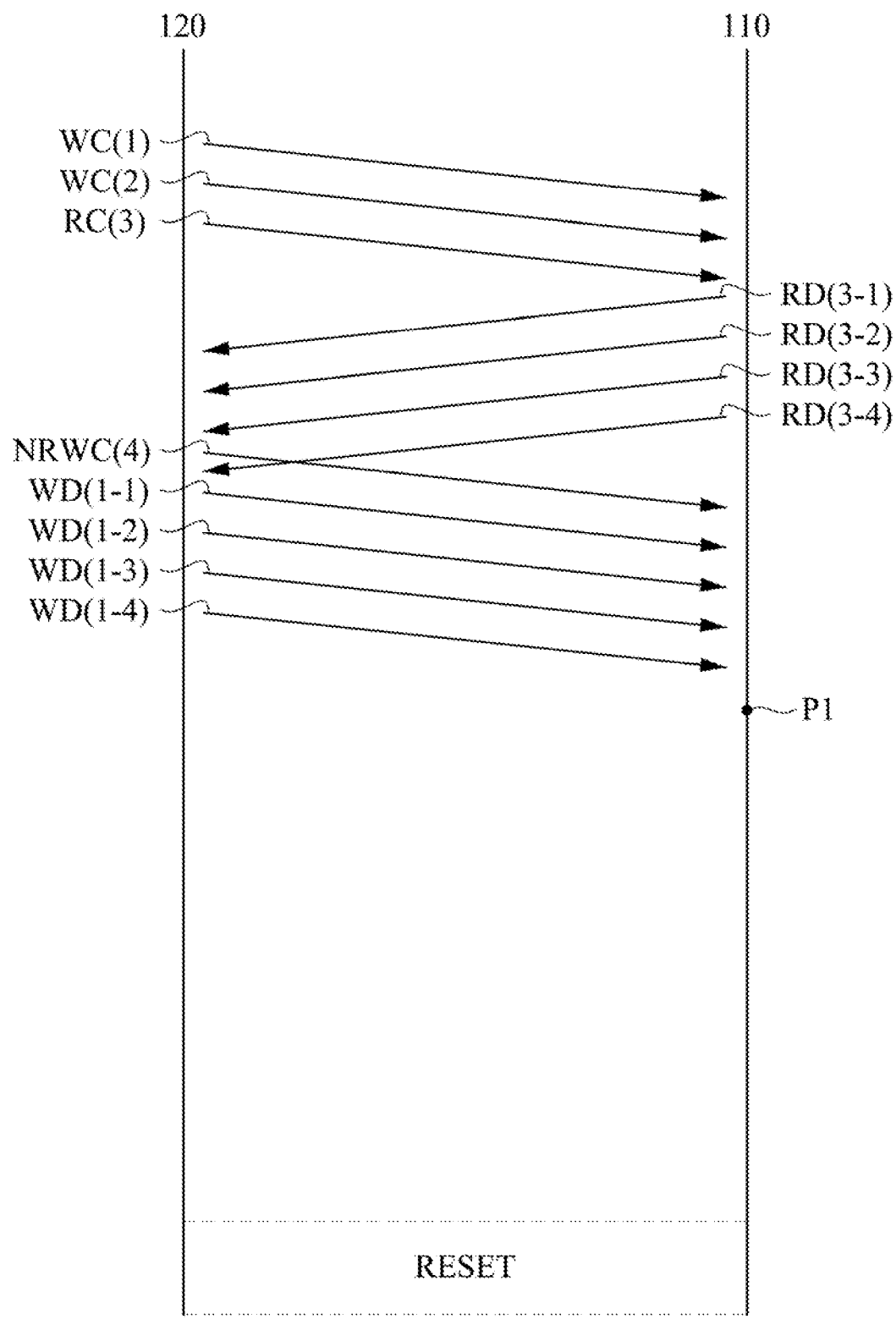
FIG. 7 depicts a schematic diagram of commands and signals transmission of a storage system according to some embodiments of the present disclosure.

FIG. 7 depicts a schematic diagram of commands and signals transmission of a storage system according to some embodiments of the present disclosure. In some embodiments, please refer to FIG. 3 and FIG. 7, a difference between the embodiment in FIG. 7 and the embodiment in FIG. 3 is that the storage device 110 stops responding to the host 120. The bridge 112 of the storage device 110 of the storage system 100 is further configured to stop responding to the host 120 according to the error state in the idle mode, so that the host 120 waits for more than a present time built in the host 120, and then resets internal components of the storage device 110 in the reset stage RESET.

Figure 8:
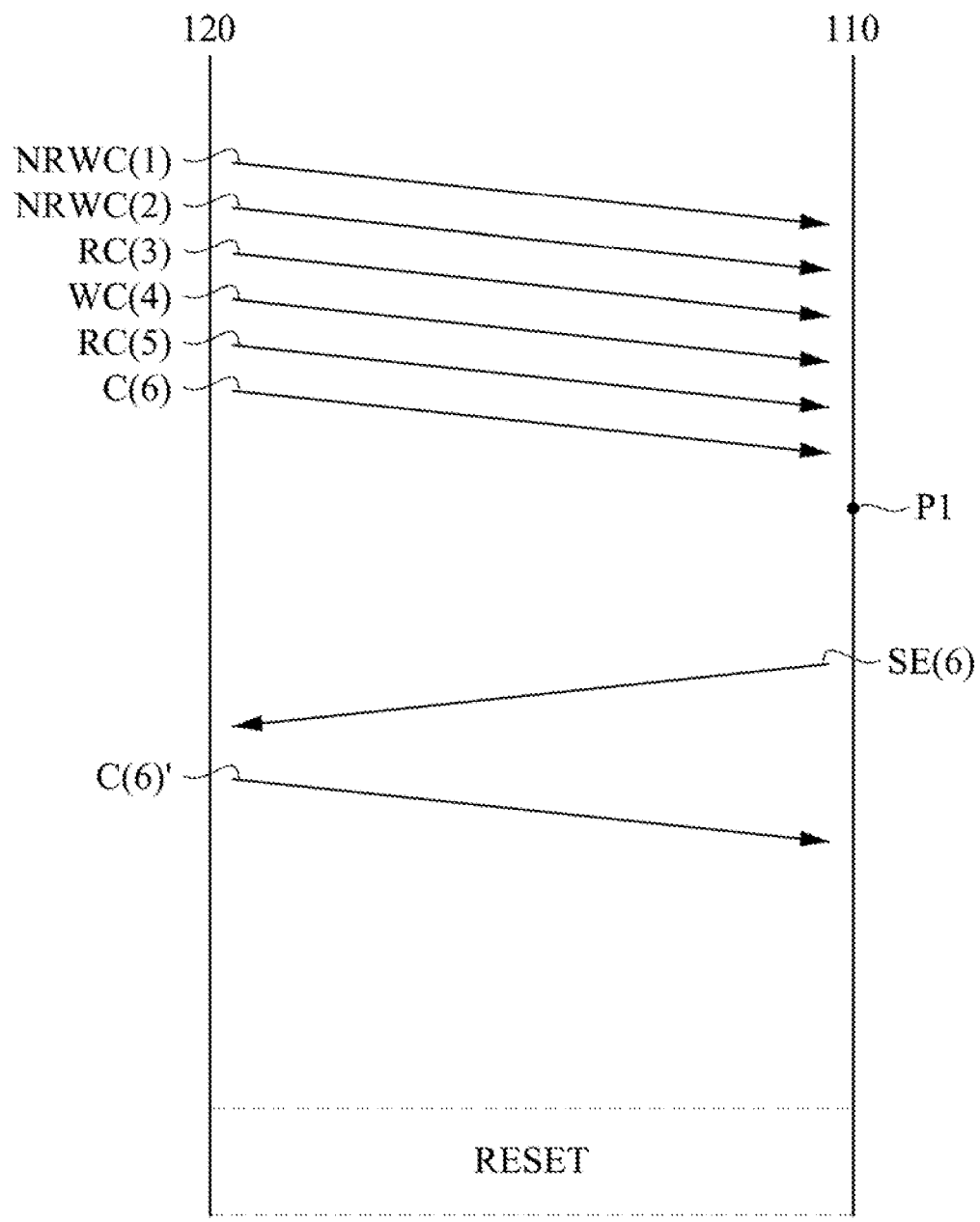
FIG. 8 depicts a schematic diagram of commands and signals transmission of a storage system according to some embodiments of the present disclosure.

FIG. 8 depicts a schematic diagram of commands and signals transmission of a storage system according to some embodiments of the present disclosure. In some embodiments, please refer to FIG. 8, a difference between the embodiment in FIG. 8 and the embodiments in FIGS. 3-7 is that a situation of commands generated by the host 120 is different and a response situation of commands executed by the bridge 112 of the storage device 110.

In some embodiments, the bridge 112 of the storage device 110 is configured to sequentially receive a non-read-write command NRWC(1), a non-read-write command NRWC(2), a read command RC(3), a write command WC(4), a read command RC(5), and a command C(6) from the host 120.

In some embodiments, the bridge 112 of the storage device 110 is configured to detect an error state of the command C(6) at the time point P1, and the bridge 112 of the storage device 110 is configured to generate a corresponding sixth status error signal SE(6) according to the error state of the command C(6).

In addition, the host 120 is configured to determine whether to generate a resend command (e.g., a resend command C(6)') according to sixth status error signal SE(6) to re-execute the command C(6).

It should be noted that when any command causes an error state, the bridge 112 of the storage device 110 can respond to a command which caused the error state.

Figure 9:
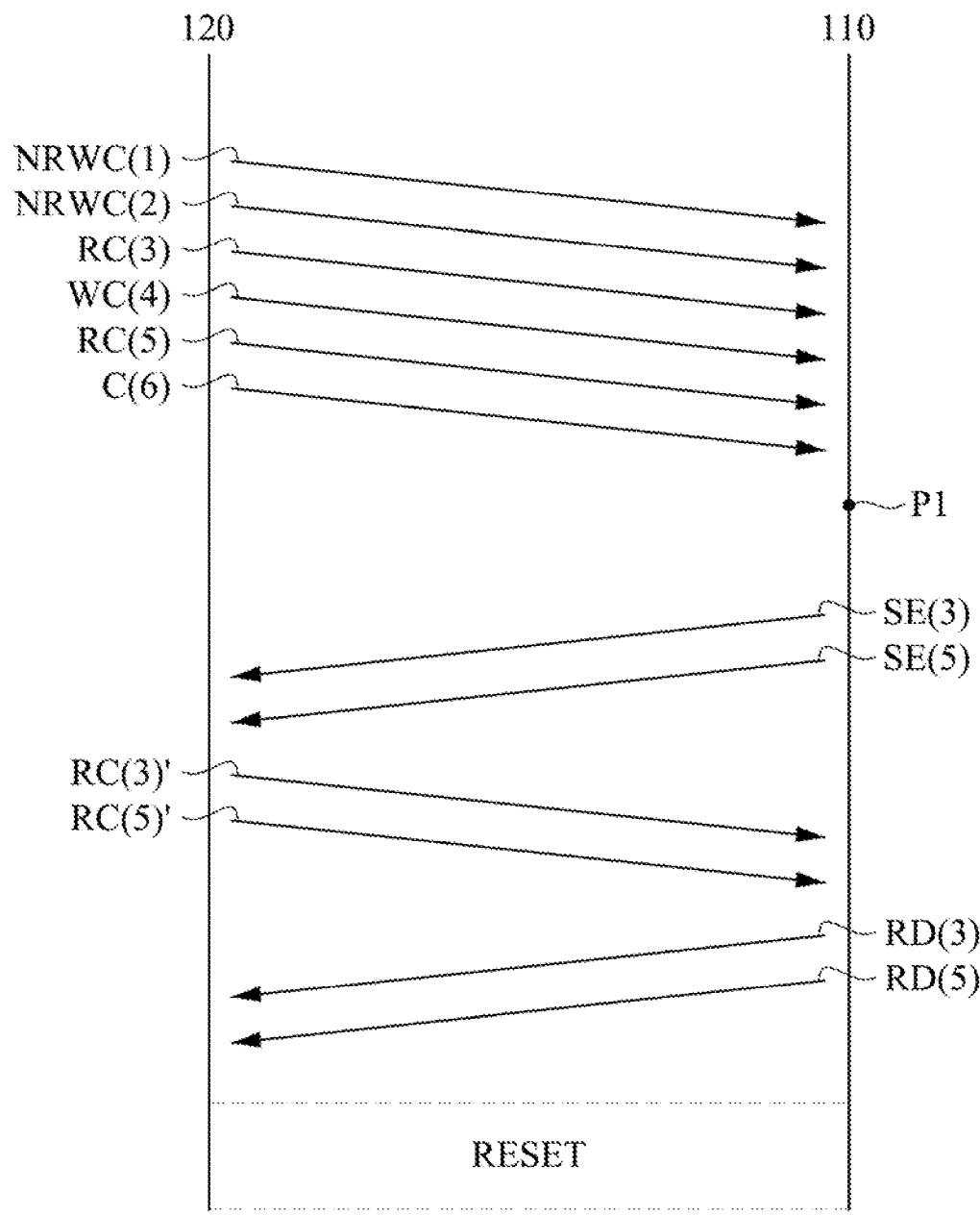
FIG. 9 depicts a schematic diagram of commands and signals transmission of a storage system according to some embodiments of the present disclosure.

FIG. 9 depicts a schematic diagram of commands and signals transmission of a storage system according to some embodiments of the present disclosure. In some embodiments, please refer to FIG. 9, a difference between the embodiment in FIG. 9 and the embodiment in FIG. 8 lies in different situations of responding to commands.

In some embodiments, the bridge 112 of the storage device 110 is configured to detect an error state of the command C(6) at the time point P1, and the bridge 112 of the storage device 110 is configured to generate a third status error signal SE(3) corresponding to the read command RC(3) and a fifth status error signal SE(5) corresponding to the read command RC(5) according to the error state of the command C(6). It should be noted that, in this embodiment, the bridge 112 only detects the command C(6) is in an error state, and rest of the commands can be in a normal state (that is a non-error state).

In addition, the host 120 is configured to determine whether to generate a resend command (e.g., a resend command RC(3)' and a resend command RC(5)') according to third status error signal SE(3) and fifth status error signal SE(5) so as to re-execute the read command RC(3) and the read command RC(5) so that the bridge 112 of the storage device 110 re-executes the read command RC(3) and the read command RC(5) to generate a piece of read data RD(3) and a piece of read data RD(5).

It should be noted that when any command causes an error state, the bridge 112 of the storage device 110 is configured to ensure that a specific type of commands (e.g., write commands, write commands, or non-read-write commands) can be completed in time during a transaction process. An advantage of adopting this method for responding to a command which caused the error state is that an error of a certain SCSI command can be avoided, thereby the data transmissions of other commands and a utilization rate of a bandwidth can be maintained.

Figure 10:
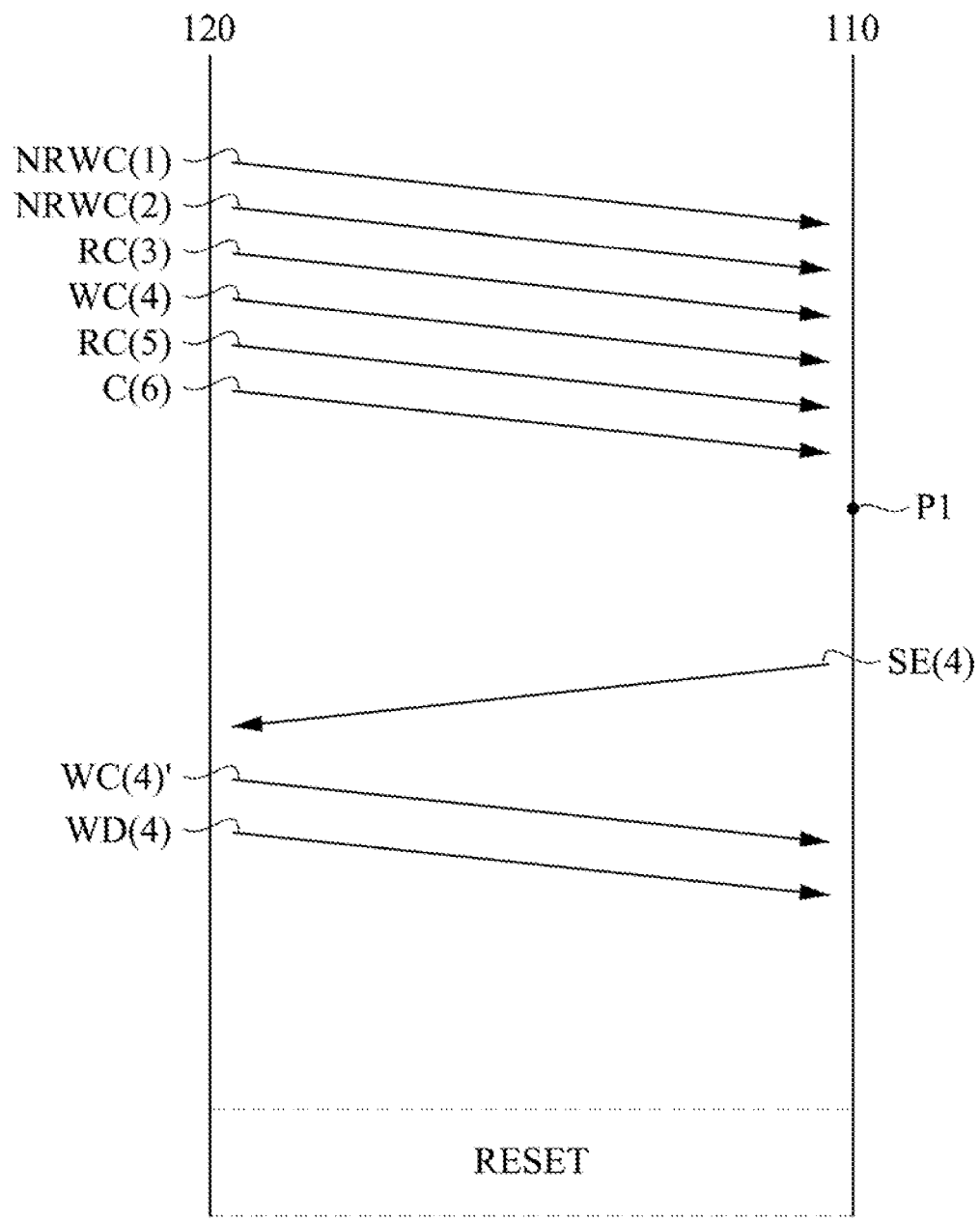
FIG. 10 depicts a schematic diagram of commands and signals transmission of a storage system according to some embodiments of the present disclosure.

FIG. 10 depicts a schematic diagram of commands and signals transmission of a storage system according to some embodiments of the present disclosure. In some embodiments, please refer to FIG. 10, a difference between the embodiment in FIG. 10 and the embodiment in FIG. 8 lies in different situations of responding to commands.

In some embodiments, the bridge 112 of the storage device 110 is configured to detect an error state of the command C(6) at the time point P1, and the bridge 112 of the storage device 110 is configured to generate a fourth status error signal SE(4) corresponding to the write command WC(4) according to the error state of the command C(6). It should be noted that, in this embodiment, the bridge 112 only detects the command C(6) is in an error state, and rest of the commands can be in a normal state (that is a non-error state).

In addition, the host 120 is configured to determine whether to generate a resend command (e.g., a resend command WC(4)') according to the fourth status error signal SE(4) so as to re-execute the write command WC(4) so that the bridge 112 of the storage device 110 re-executes the write command WC(4), to receive a piece of write data WD(4) from the host 120.

It should be noted that, similar to the embodiment in FIG. 9, when any command causes an error state, the bridge 112 of the storage device 110 is configured to ensure that a specific type of commands (e.g., write commands, write commands, or non-read-write commands) can be completed in time during a transaction process.

Figure 11:
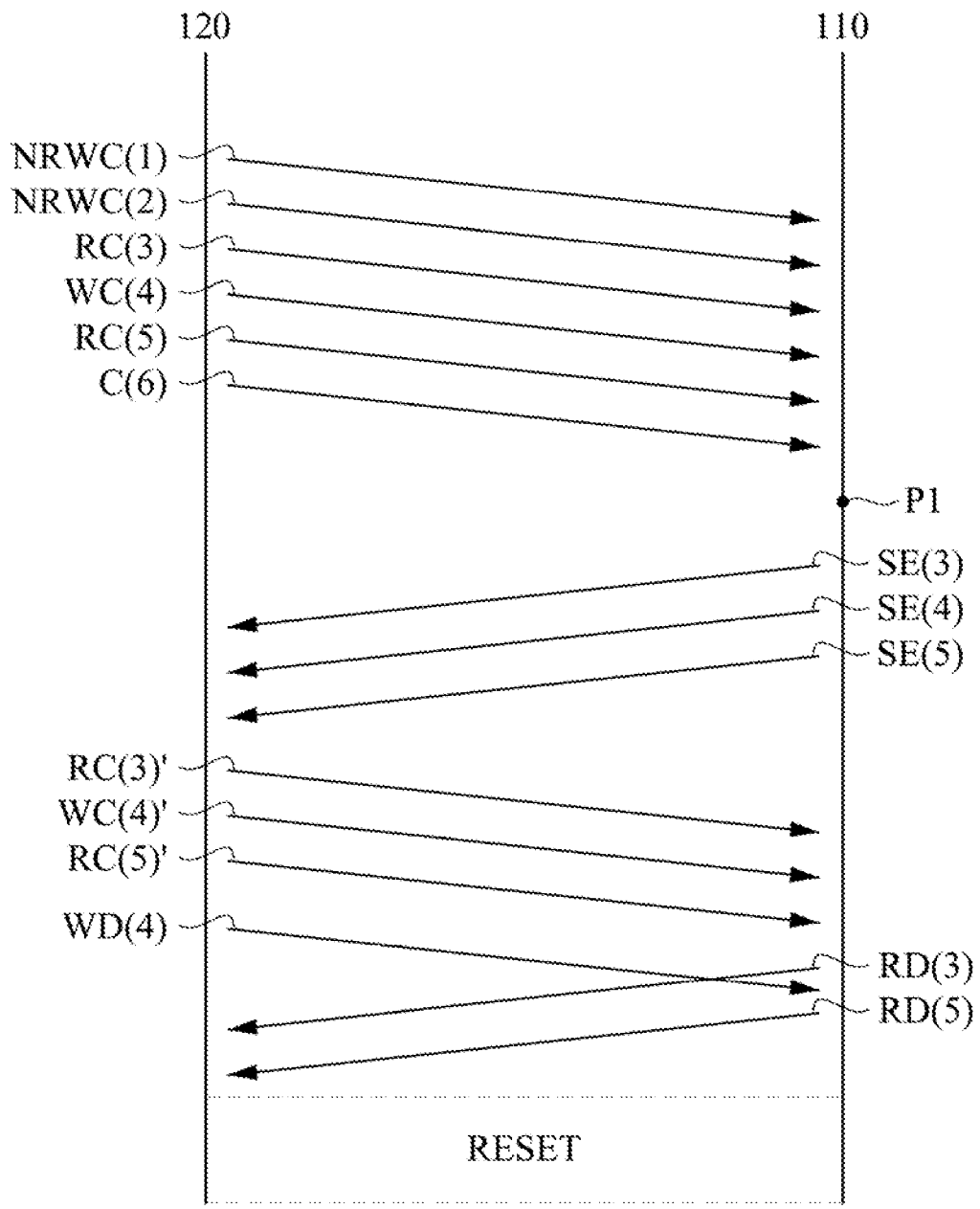
FIG. 11 depicts a schematic diagram of commands and signals transmission of a storage system according to some embodiments of the present disclosure.

FIG. 11 depicts a schematic diagram of commands and signals transmission of a storage system according to some embodiments of the present disclosure. In some embodiments, please refer to FIG. 11, a difference between the embodiment in FIG. 11 and the embodiment in FIG. 8 lies in different situations of responding to commands.

In some embodiments, the bridge 112 of the storage device 110 is configured to detect an error state of the command C(6) at the time point P1, and the bridge 112 of the storage device 110 is configured to generate a third status error signal SE(3) corresponding to the read command RC(3), a fifth status error signal SE(5) corresponding to the read command RC(5), and a fourth status error signal SE(4) corresponding to the write command WC(4) according to the error state of the command C(6). It should be noted that, in this embodiment, the bridge 112 only detects the command C(6) is in an error state, and rest of the commands can be in a normal state (that is a non-error state).

In addition, the host 120 is configured to determine whether to generate a resend command (e.g., a resend command RC(3)', a resend command WC(4)', and a resend command RC(5)') according to the third status error signal SE(3), the fourth status error signal SE(4), and the fifth status error signal SE(5) so as to re-execute the read command RC(3), the write command WC(4), and the read command RC(5), so that the bridge 112 of the storage device 110 re-executes the read command RC(3), the write command WC(4), and the read command RC(5) to receive a piece of write data WD(4) from the host 120 and to generate a piece of read data RD(3) and a piece of read data RD(5).

It should be noted that when any command causes an error state, the bridge 112 of the storage device 110 is configured to ensure that multiple types of commands (e.g., at least one of write commands, write commands, or non-read-write commands) can be completed in time during a transaction process. In other word, the method for responding to a command which caused the error state, the storage device, and the storage system of the present disclosure can respond to partial commands or all commands for multiple types of commands in response to an error status of any command.

Figure 12:
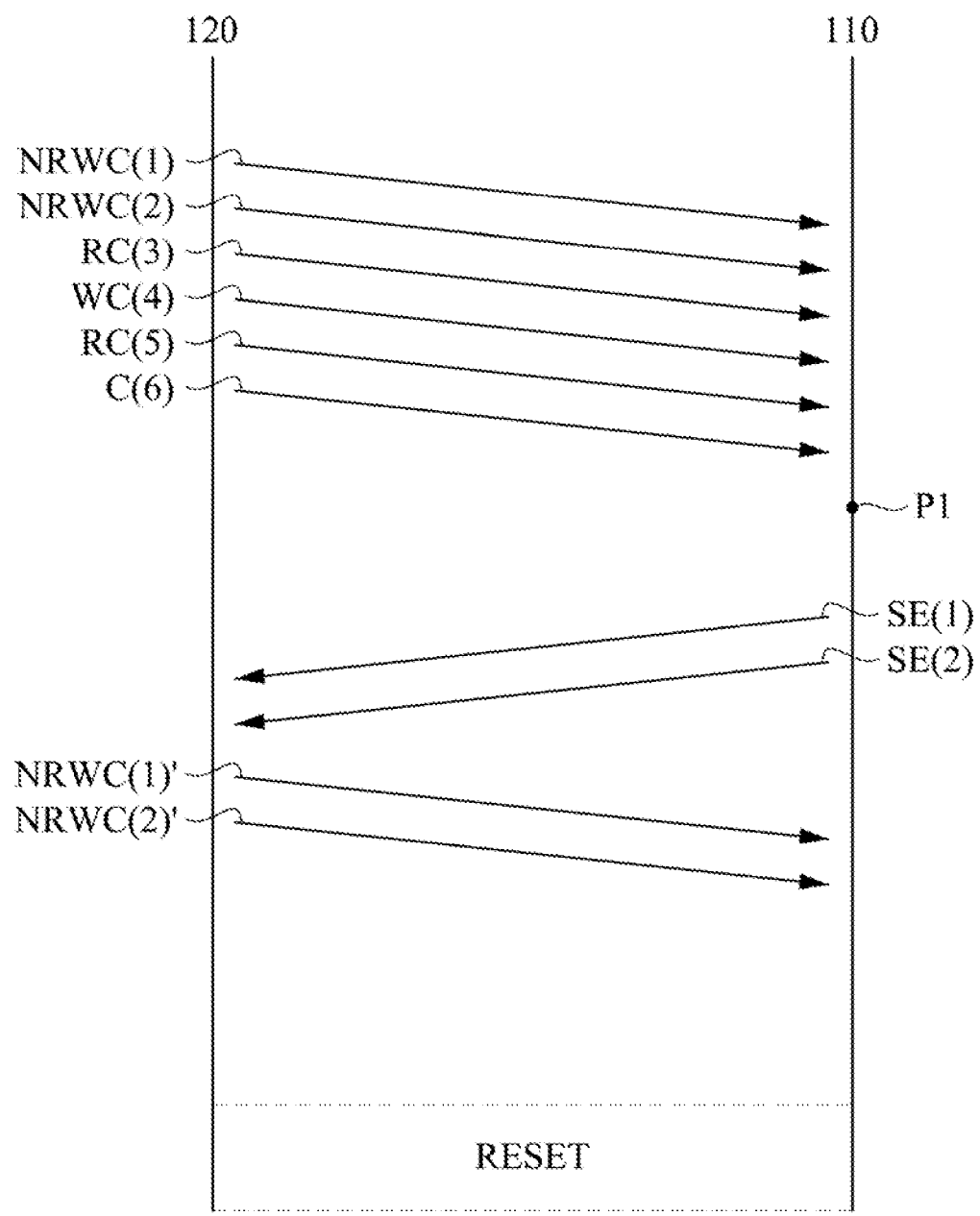
FIG. 12 depicts a schematic diagram of commands and signals transmission of a storage system according to some embodiments of the present disclosure.

FIG. 12 depicts a schematic diagram of commands and signals transmission of a storage system according to some embodiments of the present disclosure. In some embodiments, please refer to FIG. 12, a difference between the embodiment in FIG. 12 and the embodiment in FIG. 8 lies in different situations of responding to commands.

In some embodiments, the bridge 112 of the storage device 110 is configured to detect an error state of the command C(6) at the time point P1, and the bridge 112 of the storage device 110 is configured to generate a first status error signal SE(1) corresponding to a non-read-write command NRWC(1) and a second status error signal SE(2) corresponding to a non-read-write command NRWC(2) according to the error state of the command C(6). It should be noted that, in this embodiment, the bridge 112 only detects the command C(6) is in an error state, and rest of the commands can be in a normal state (that is a non-error state.

In addition, the host 120 is configured to determine whether to generate a resend command (e.g., a resend command NRWC(1)' and a resend command NRWWC(2)') according to the first status error signal SE(1) and the second status error signal SE(2) so as to re-execute the non-read-write command NRWC(1) and the non-read-write command NRWC(2).

Based on the above embodiments, the present disclosure provides a method for responding to a command, a storage device, and a storage system so as to make a response mode of SCSI commands more flexible. A response mode can respond to commands according to an error state of any command, respond to specific types of commands, respond to part or all of multiple types of commands, or even not respond.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A method for responding to a command, adapted for a storage device, comprising:
sequentially receiving a first command and a second command by a bridge of the storage device from a host;
executing the first command and the second command by the bridge to generate a status completion signal or a status error signal; and
detecting an error state of at least one of the first command and the second command by the bridge to execute a response mode or an idle mode according to the error state so as to respond to the host, wherein detecting the error state of the at least one of the first command and the second command by the bridge to execute the response mode or the idle mode according to the error state so as to respond to the host comprises:
stopping responding to the host according to the error state by the bridge in the idle mode.

2. The method for responding to the command of claim 1, wherein detecting the error state of the at least one of the first command and the second command by the bridge to execute the response mode or the idle mode according to the error state so as to respond to the host comprises:
generating and transmitting the status error signal to the host by the bridge according to the error state so as to respond to the at least one of the first command and the second command in the response mode.

3. The method for responding to the command of claim 2, wherein the first command comprises a write command, the second command comprises a read command, and the first command comprises a first subcommand and a second subcommand, wherein detecting the error state of at least one of the first command and the second command by the bridge to execute the response mode or the idle mode according to the error state so as to respond to the host further comprises:
generating the status completion signal to respond to the second command by the bridge in a specific type of command response mode of the response mode;
detecting the error state of the at least one of the first subcommand and the second subcommand by the bridge; and
generating the status error signal according to the error state by the bridge so as to respond to the first subcommand and the second subcommand.

4. The method for responding to the command of claim 3, wherein detecting the error state of the at least one of the first command and the second command by the bridge to execute the response mode or the idle mode according to the error state so as to respond to the host further comprises:
generating the status completion signal to respond to the first subcommand and the second command by the bridge in an error command response mode of the response mode;
detecting the error state of the second subcommand by the bridge; and
generating the status error signal according to the error state by the bridge so as to respond to the second subcommand.

5. The method for responding to the command of claim 4, wherein detecting the error state of the at least one of the first command and the second command by the bridge to execute the response mode or the idle mode according to the error state so as to respond to the host further comprises:
detecting the error state of the at least one of the first command and the second command by the bridge in all of commands of the response mode; and
generating the status error signal according to the error state by the bridge so as to respond to the first command and the second command.

6. The method for responding to the command of claim 1, further comprising:

receiving a third command by the bridge of the storage device from the host;

wherein detecting the error state of the at least one of the first command and the second command by the bridge to execute the response mode or the idle mode according to the error state so as to respond to the host comprises:

generating the status completion signal to respond to the third command by the bridge in multiple types of command of the response mode;

detecting the error state of the at least one of the first command and the second command by the bridge; and generating the status error signal according to the error state by the bridge so as to respond to the first command and the second command.

7. The method for responding to the command of claim 1, wherein detecting the error state of the at least one of the first command and the second command by the bridge to execute the response mode or the idle mode according to the error state so as to respond to the host comprises:

detecting the error state of the first command by the bridge in the response mode; and generating the status error signal according to the error state by the bridge so as to respond to the second command.

8. A storage device, comprising:

a memory; and a bridge, coupled to the memory, and configured to sequentially receive a first command and a second command from a host, wherein the bridge is configured to execute the first command and the second command in the memory to generate a status completion signal or a status error signal to the host, wherein the bridge is configured to detect an error state of at least one of the first command and the second command to execute a response mode or an idle mode according to the error state so as to respond to the host, wherein the bridge is further configured to detect the error state of the first command in the response mode to generate the status error signal according to the error state so as to respond to the second command.

9. The storage device of claim 8, wherein the bridge is further configured to generate and transmit the status error signal to the host according to the error state so as to respond to the at least one of the first command and the second command in the response mode.

10. The storage device of claim 9, wherein the first command comprises a write command, the second command comprises a read command, and the first command comprises a first subcommand and a second subcommand, wherein the bridge is further configured to generate the status completion signal to respond to the second command in a specific type of command response mode of the response mode, the bridge is further configured to detect the error state of at least one of the first subcommand and the second subcommand, and the bridge is further configured to generate the status error signal according to the error state so as to respond to the first subcommand and the second subcommand.

11. The storage device of claim 10, wherein the bridge is further configured to generate the status completion signal to respond to the first subcommand and the second command in an error command response mode of the response mode, the bridge is further configured to detect the error state of the second subcommand, and the bridge is further configured to generate the status error signal according to the error state so as to respond to the second subcommand.

12. The storage device of claim 11, wherein the bridge is further configured to detect the error state of the at least one of the first command and the second command in all of commands of the response mode, and the bridge is further configured to generate the status error signal according to the error state so as to respond to the first command and the second command.

13. The storage device of claim 8, wherein the bridge is further configured to receive a third command from the host, wherein the bridge is further configured to generate the status completion signal to respond to the third command in multiple types of command response mode of the response mode, the bridge is further configured to detect the error state of the at least one of the first command and the second command, and the bridge is further configured to generate the status error signal according to the error state so as to respond to the first command and the second command.

14. The storage device of claim 8, wherein the bridge is further configured to stop responding to the host according to the error state in the idle mode.

15. A storage system, comprising:

a host, configured to generate a first command and a second command; and a storage device, coupled to the host, wherein the storage device comprises:

a memory; and a bridge, coupled to the host and the memory, and configured to sequentially receive the first command and the second command, wherein the bridge is configured to execute the first command and the second command in the memory to generate a status completion signal or a status error signal to the host, wherein the bridge is configured to detect an error state of at least one of the first command and the second command to execute a response mode or an idle mode according to the error state so as to respond to the host, wherein the bridge is further configured to stop responding to the host according to the error state in the idle mode.

16. The storage system of claim 15, wherein the bridge is further configured to generate and transmit the status error signal to the host according to the error state so as to respond to the at least one of the first command and the second command in the response mode.

17. The storage system of claim 16, wherein the first command comprises a write command, the second command comprises a read command, and the first command comprises a first subcommand and a second subcommand, wherein the bridge is further configured to generate the status completion signal to respond to the second command in a specific type of command response mode of the response mode, the bridge is further configured to detect the error state of at least one of the first subcommand and the second subcommand, and the bridge is further configured to generate the status error signal according to the error state so as to respond to the first subcommand and the second subcommand;

wherein the bridge is further configured to generate the status completion signal to respond to the first subcommand and the second command in an error command response mode of the response mode, the bridge is further configured to detect the error state of the second subcommand, and the bridge is further configured to generate the status error signal according to the error state so as to respond to the second subcommand.

18. The storage system of claim 17, wherein the bridge is further configured to detect the error state of the at least one of the first command and the second command in all of commands of the response mode, and the bridge is further configured to generate the status error signal according to the error state so as to respond to the first command and the second command.

* * * * *